United States Patent Office 3,553,194
Patented Jan. 5, 1971

3,553,194
STARCH PHOSPHONATES
Frank Verbanac and Kenneth B. Moser, Decatur, Ill., assignors to A. E. Staley Manufacturing Company, Decatur, Ill., a corporation of Delaware
No Drawing. Filed Dec. 28, 1967, Ser. No. 694,056
Int. Cl. C08b 19/04
U.S. Cl. 260—233.5                              7 Claims

ABSTRACT OF THE DISCLOSURE

Starch ether phosphonates prepared by reacting starch with phosphonating agents, wherein the organo group bonded directly to the phosphorus atom is a vinyl group, an alkane substituted with a vicinal halohydroxy group, a vicinal epoxy group or an omega-halo group.

---

This invention relates to starch ether phosphonates.

In recent years there has been considerable interest in starch phosphates, which contain readily hydratable anionic potentially reactive groups. These derivatives can be used as thickeners in foods, fillers and binders in pharmaceuticals, flocculants and binders in ore refining, as warp sizing agents, pigment adhesives for coating cellulosic webs, beater additives, etc. See for example, Water-Soluble Resins by Davidson-Sittig (1962) at page 45, U.S. Pat. 3,132,066, U.S. Pat. 3,269,885, etc.

These products are normally prepared by forming an aqueous slurry of starch and phosphate, drying the composition to a semi-dry state, followed by roasting under carefully controlled conditions to form monostarch phosphates and/or distarch phosphates. Depending on its water-sensitivity the product can be purified by washing with water or alcohol. The processes for producing these products and the products themselves have several drawbacks. For example, while the starch and phosphate are normally slurried together in water in order to disperse the phosphate uniformly on the starch, the slurry cannot be employed as the reaction media since the phosphate only reacts with starch under superficially dry conditions. Further, the starch phosphates being esters are unstable in the sense that they are hydrolyzable under alkaline and acid conditions.

The general object of this invention is to provide a new class of phosphorus containing starch derivatives.

A second object of this invention is to provide anionic phosphorus containing starch derivatives wherein the anionic group is bonded to the starch through an ether linkage.

Another object of this invention is provide anionic phosphorus containing starch derivatives, which can be produced under aqueous slurry reaction conditions.

Other objects appear hereinafter.

We have now found that the objects of this invention can be attained with starch ether phosphonates such as those having the structure:

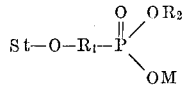

wherein St is starch; $R_1$ is methylene, alkylene of 2 to 18 carbon atoms or hydroxyalkylene of 2 to 18 carbon atoms; $R_2$ is alkyl or substituted alkyl of 1 to 18 carbon atoms, alkenyl of 2 to 18 carbon atoms, $R_1OSt$, St or M; and M is a cation. These materials can be used for the same uses as the aforesaid starch phosphates.

The starch ether phosphonates of this invention can be prepared by reacting starch under alkaline conditions with a suitable phosphonating agent wherein the organo group bonded directly to the phosphorus atom is a vinyl group, an alkane substituted with a vicinal halohydroxy group, a vicinal epoxy group or an omega-halo group. Suitable phosphonating agents include (1) vinylphosphonates such as diethyl vinylphosphonate, dichloroethyl vinylphosphonate, etc.; (2) vicinal halohydroxyalkanephosphonates, such as 1-chloro-2-hydroxyethanephosphonic acid, 2-chloro-1-hydroxyethanephosphonic acid, 2-bromo-3-hydroxypropanephosphonic acid, methyl hydrogen 2-chloro-3-hydroxypropanephosphonate, di(N,N-diethylaminoethyl) 2 - chloro-3-hydroxypropanephosphonate, diglycidyl 3-chloro-4-hydroxybutanephosphonate, distearyl 1-chloro-2-hydroxyethanephosphonate, etc.; (3) vicinal epoxyalkane phosphonates, such as epoxyethanephosphonic acid, 2,3-epoxypropanephosphonic acid, diethyl 2,3-epoxypropanephosphonate, diallyl 2,3-epoxypropanephosphonate, 3,4-epoxybutanephosphonic acid, epoxyoleylphosphonic acid, etc. and (4) omega-haloalkanephosphonates such as chloromethanephosphonic acid, dimethyl bromomethanephosphonate, 3-bromopropanephosphonic acid, etc. The vicinal halohydroxyalkanephosphonates are new compounds and the subject of copending application Ser. No. 694,091 filed on even date herewith.

The first three classes of phosphonating agents are preferred since they react readily with aqueous alkaline slurries or pastes of starch under mild reaction conditions, whereas, the omega-haloalkanephosphonates, particularly the halomethanephosphonates, require more sever reaction conditions. All of the resultant products contain anionic ether phosphonate groups irrespective of whether a diester is employed. Even under mild conditions approximately half of the diester groups are converted to the free acid or salt form. (M in the above formula is H, alkali metal or alkaline earth metal) and/or take part in a transesterification reaction with starch hydroxyl groups. In this way the starch molecules are cross-linked through both an ether and ester phosphonate function (i.e. $R_2$ in the above formula is starch). A second type of cross-linkage can be obtained by using a phosphonating agent having an alkyl ester substituted with a halogen group or preferably either a vicinal epoxy or vicinal halohydroxy group. In such case $R_2$ in the above formula can be a mixture of St and $R_1OSt$. Cross-linking is avoided by using the free acids or salts thereof.

The phosphonating agents can be used in appropriate concentrations to produce starch ether phosphonates having a D.S. of 0.0001 to 3. Generally, it is preferred to react 0.1 to 100 parts by weight phosphonating agent per 200 parts by weight starch (dry substance).

The starch used in this invention can be any native starch, modified starch or derivative of starch having available free hydroxyl groups. Corn starch, tapioca starch, rice starch, waxy maize starch, potato starch, wheat starch, high amylose corn starch and the amylose and amylopectin fractions therefrom are representative of the various native starch varieties and starch fractions that may be used in this invention. Any of these starch varieties may be modified, as by enzyme treatment, by oxidation with alkaline hypochlorite or by treatment with an acid. Starch derivatives, such as starch acetates, carboxymethyl starch, carboxyethyl starch, methyl starch, hydroxyethyl starch, hydroxypropyl starch, N,N-diethylaminoethyl starch, quaternary ammonium starch ethers, etc. and starches cross-linked with epichlorohydrin, phosphorus oxychloride, etc. can also be used. The starch can be used in its original granular form or in a pre-pasted form such as that resulting from the extrusion pasting of starch or roll drying of starch. In general, the granular native starches, particularly corn starch, are preferred because of their low cost and availability.

In accordance with this invention, the alkaline starch phosphonating catalysts that can be used include sodium hydroxide, potassium hydroxide, calcium hydroxide, barium hydroxide, sodium carbonate, disodium phosphate, sodium aluminate, tetramethyl ammonium hydroxide, etc. The above compounds are representative of the alkali metal hydroxides, alkali metal salts of weak acids, quaternary ammonium hydroxides, and alkaline earth metal hydroxides.

Mineral acids, such as hydrochloric acid and sulfuric acid, and Lewis acids such as boron trifluoride etherate, can also be used to catalyze the reaction of epoxyalkanephosphonates and are the preferred catalysts when the epoxy group is internal.

In the preferred method of preparing the starch derivatives of this invention, granular starch is suspended in a polar solvent, preferably water, in such manner that the starch comprises from about 2 to 60% by weight of the composition and then an alkaline catalyst is added. Alternatively, the granular starch may be suspended in a polar solvent containing the alkaline catalyst and/or the starch pasted in water. The phosphonating reaction is then carried out at a pH of from about 9 to 13 with one of the preferred phosphonating agents (vicinal halohydroxyalkanephosphonate, vicinal epoxyalkanephosphonate or vinylphosphonate) and sufficient alkali to establish the pH. The reaction proceeds rapidly at moderate temperature and, in some cases, may require external cooling to prevent gelatinization of the starch derivative where a granular product is desired.

Temperature of the etherification reaction may be as low as 10° C. or as high as 200° C. As a rule, reaction time varies inversely with reaction temperature. For example, the ether can be prepared by heating starch, reagent, alkaline catalyst and a suitable plasticizer, e.g., water, under conditions of severe working as in a plastics extruder as disclosed in U.S. Pat. 3,137,592, filed Apr. 3, 1961. With this method, the reaction temperature can range from 150–200° C. and the reaction time, i.e., the extruder retention time, can be as short as 1 to 2 minutes. Much lower temperatures are required if the starch ether is to be recovered in original granule form from water as reaction medium. To avoid undesirable swelling of the starch granules during such etherification, the reaction temperature is preferably kept below the swelling or gelatinization temperature of the original starch. Thus 40–75° C. is a satisfactory reaction temperature range for the preparation of ungelatinized ethers of common corn starch by water slurry reaction. Reaction temperatures up to 100° C. may be advantageously used in aqueous paste etherifications or in original granule etherifications when the reaction medium is chosen to suppress gelatinization or swelling. Examples of reaction media which inhibit starch granule swelling are water solutions of selected inorganic salts, e.g. sodium chloride, sodium sulfate, sodium carbonate, magnesium sulfate, and organic liquids, e.g., lower alcohols and dioxane.

As indicated above, the proportion of reaction medium for the etherification reaction can vary widely. In the extruder method, for example, water may be the reaction medium and plasticizer, at a proportion of 25 parts by weight, for example, per 100 parts by weight of dry substance starch. In the preparation of ungelatinized ethers by slurry reaction, the proportion of reaction medium (e.g. water, aqueous salt solution, lower alcohol) may be as small as 125 mls. per 100 gms. of starch but preferably will be larger, e.g. 200 mls. per 100 gms. of starch. Still larger proportions of reaction medium, e.g. 10 to 20 mls. per gram of starch, may be required in the paste etherifications because of viscosity effects. Although water is the preferred medium for paste etherification, other liquids, e.g., dimethylsulfoxide, may be used.

The etherification reaction may also be performed on granular starch in the superficially dry condition. For example, ungelatinized starch containing 20% moisture may be tumbled and heated to yield an ungelatinized starch ether. Generally more than 10% water is required.

As indicated above, the products of this invention can be employed as wet-end additives in the production of paper, as binders for clay coatings on paper, in warp sizing of fibers, as thickeners, etc. Generally speaking, best results have been obtained in wet-end sizing of paper when the starch ether phosphonate is employed in acid furnishes. If the starch ether phosphonate is to be employed in alkaline furnishes, the base starch should be substituted with either a teritary aminoalkyl group such as those described in U.S. Pat. 2,935,436 or a quaternary ammoniumalkyl ether group such as those described in U.S. Pat. 3,346,563.

The examples following are merely illustrative and should not be construed as limiting the scope of the invention.

EXAMPLE I

One thousand one hundred and eighty grams granular corn starch (1,036 grams dry solids basis, 6.4 moles) was slurried in 2,105 grams water containing 13 grams calcium hydroxide at 45° C. Sixty and seven-tenths grams of diethyl chlorohydroxyethanephosphonate (0.28 mole) was added dropwise over a five hour period while maintaining the reaction mixture at about 50° C. with heating and at a pH of about 9 to 11.1 by adding 35.36 grams of solid calcium hydroxide as needed. Nineteen hours after the addition of diethyl chlorohydroxyethanephosphonate was ended, the reaction mass was neutralized with 6 N hydrochloric acid, filtered, washed with water and air dried. The granular starch product contained 0.29% by weight phosphorus and had a D.S. (degree of substitution) of 0.015.

The diethyl chlorohydroxyethanephosphonate was prepared by sparging 164.2 grams diethyl vinylphosphonate (1 mole) dissolved in 640 ml. of distilled water with about 72 grams chlorine for 1½ hours while cooling the reaction mass at about 14 to 30° C. The reaction was terminated when the solution turned yellow and then sparged with air until colorless. The solution was adjusted to pH 5.0 with aqueous sodium hydroxide, extracted once with 200 ml. methylene chloride and four times with 100 ml. of portions of methylene chloride. The extracts were combined, dried over sodium sulfate, concentrated by distilling off methylene chloride, and fractionally vacuum distilled. Vacuum distillation of the residue at 105° C./0.34 mm. to 105.5° C./0.35 mm. yielded 118.7 grams of diethyl vicinal chlorohydroxyethanephosphonate containing 33.04% C (33.27% theoretical), 6.08% H (6.51% theoretical), 14.09% P (14.30% theoretical) and 16.56% Cl (16.37% theoretical).

EXAMPLE II

Twenty-seven and seventy-five hundredths grams granular corn starch (24.4 grams dry solids basis, 0.15 mole) was slurried in 38.6 ml. water containing 1.25 grams sodium hydroxide and 17.7 grams sodium sulfate. After the starch slurry was sparged with nitrogen, 1.63 grams diethyl vicinal chlorohydroxyethanephosphonate (0.0075 mole) was added. The bottle was capped and rotated in a polymerization bath at 45° C. for about 18 hours. The contents of the bottle were poured into a beaker, adjusted to pH 7 with 6 N HCl, filtered, washed with distilled water, reslurried in 80 ml. water, filtered, washed and allowed to air dry. The granular starch phosphonate had a D.S. of 0.0138 as determined by phosphorus analysis.

EXAMPLE III

This example illustrates the reaction of granular starch with diethyl 2,3-chlorohydroxypropanephosphonate. Example II was repeated except that the diethyl chlorohydroxyethanephosphonate was replaced with 1.23 grams of diethyl 2,3-chlorohydroxypropanephosphonate (0.0053 mole). The resultant starch phosphonate had a D.S. of 0.0090 as determined by phosphorus analysis.

The diethyl 2,3-chlorohydroxypropanephosphonate was prepared in the same manner as the diethyl chlorohydroxyethanephosphonate of Example I by replacing the diethyl vinylphosphonate with an equivalent amount of diethyl 2-propenephosphonate.

EXAMPLE IV

This example illustrates the reaction of granular corn starch with diethyl 2,3-epoxypropanephosphonate. Example II was repeated except that the diethyl chlorohydroxyethanephosphonate was replaced with 2.91 grams diethyl 2,3-epoxypropanephosphonate (0.015 mole). The resultant starch phosphonate had a D.S. of 0.0074 as determined by phosphorus analysis.

EXAMPLE V

This example illustrates the reaction of grnaular starch with diethyl vinylphosphonate. Example II was repeated except that the diethyl chlorohydroxyethanephosphate was replaced with 1.23 grams diethyl vinylphosphonate (0.0075 mole). The resultant starch phosphonate had a D.S. of 0.0159 as determined by phosphorus analysis.

EXAMPLE VI

This example illustrates the reaction of granular starch with di(2-chloroethyl) vinylphosphonate. Example II was repeated except that the diethyl chlorohydroxyethanephosphonate was replaced with 3.5 grams of di(2-chloroethyl) vinylphosphonate (0.015 mole). The resultant starch phosphonate had a D.S. of 0.0182 as determined by phosphorus analysis.

EXAMPLE VII

Twenty-seven and seventy-five hundredths grams granular corn starch (24.4 grams dry solids basis, 0.15 mole) was slurried in 23.6 ml. water containing 2.44 grams calcium hydroxide. After the starch slurry was sparged with nitrogen, 2.41 grams of vicinal chlorohydroxyethanephosphonic acid (0.015 mole) dissolved in 15 ml. water was added. The bottle was capped and rotated in a polymerization bath at 45° C. for about one and one-half hours. An additional 30 ml. of water was added to the reaction mass and the reaction was continued at 45° C. for an additional 16½ hours. The contents of the bottle were poured into a beaker, adjusted to pH 7 with 6 N HCl, filtered, washed with water, reslurried in 80 ml. water, filtered, washed and allowed to air dry. The granular starch phosponate had a D.S. of 0.028 as determined by phosphorus analysis.

The vincinal chlorohydroxyethanephosphonic acid used in this example was prepared by adding 20.5 ml. water dropwise into 79.6 grams vinylphosphonic acid dichloride (0.549 mole) dissolved in 200 ml. of methylene chloride, while maintaining the reaction at 15° C. The upper layer of methylene chloride was decanted and the lower layer containing vinylphosphonic acid was subjected to a vacuum in order to remove residual hydrogen chloride and methylene chloride. The syrupy product, which weighed 50.8 grams, was dissolved in 458 ml. water and the solution cooled in a water bath at about 15 to 20° C. while 40.4 grams of chlorine gas was sparged into it. At this point a yellow color persisted in the solution (about 30 minutes) and the sparging was terminated. The resultant solution was sparged wtih air until the solution was clear.

EXAMPLE VIII

This example illustrates the derivatization of an aqueous alkaline solution of hydroxyethyl amylose using 3-bromopropanephosphonic acid. Twenty-three and four-tenths of hydroxyethyl amylose having on an average 0.3 mole of combined ethylene oxide per each anhydroglucose unit (0.133 mole of hydroxyethyl amylose) was dissolved in 162 ml. of water by heating to 78° C. A solution of 27.0 grams of 3-bromopropanephosponic acid (0.133 mole) in 69 ml. of water was added dropwise to the reaction medium over a period of 3 hours while maintaining the reaction temperature at 78° C. Simultaneously 30 ml. of 44.9% by weight aqueous sodium hydroxide was added. The reaction mass was cooled to 30° C., adjusted to pH 7 with 6 N HCl and then poured into 355 ml. of methanol. The solution was dialyzed, concentrated by distilling off the methanol, and the resultant aqueous solution roll dried. The resultant hydroxyethyl amylose ether phosphonate had a phosphonate D.S. of 0.042 as determined by phosphorus analysis.

EXAMPLE IX

This example illustrates the reaction of chloromethylphosphonic acid with starch using an extruder of the type described in U.S. Pat. No. 3,137,592. Twenty-two grams of chloromethylphosphonic acid was dissolved in 50 ml. of water and neutralized with 1 N sodium hydroxide. The solution was mixed thoroughly with 500 grams of granular corn starch. This product was then thoroughly mixed with 15 grams of sodium aluminate dissolved in 50 ml. of water. The mixture was extruded in a 2 inch laboratory extruder at 135 to 165° C. using a slit opening of 0.015 inch and a speed of 60 r.p.m. The phosphonomethyl starch was washed with 50% by weight aqueous methanol and air dried. The product had a phosphonate D.S. of 0.0063 as measured by phosphorus analysis.

Since many embodiments of this invention may be made and since many changes may be made in the embodiments described, the foregoing is to be interpreted as illustrative only and our invention is defined by the claims appended hereafter.

We claim:

1. Starch ether phosphonates having the structure

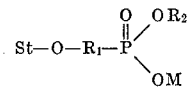

wherein St is starch; $R_1$ is selected from the group consisting of methylene, alkylene of 2 to 18 carbon atoms and hydroxyalkylene of 2 to 18 carbon atoms; $R_2$ is selected from the group consisting of alkyl having from 1 to 18 carbon atoms, substituted alkyl of 1 to 18 carbon atoms, alkenyl of 2 to 18 carbon atoms, —$R_1$—O—St, —St and M; and M is selected from the group consisting of H, alkali metal, alkaline earth metal and —St; said starch ether phosphonate having a degree of substitution in the range of from 0.0001 to 3.

2. The method of preparing a starch ether phosphonate which comprises reacting starch with a phosphonating agent in the presence of an alkaline catalyst selected from the group consisting of alkali metal hydroxides, alkali metal salts of weak acids, quaternary ammonium hydroxides and alkaline earth metal hydroxides at a temperature within the range of from 10° C. to 200° C., wherein said phosphonating agent is selected from the group consisting of vinyl phosphonates, vicinal halohydroxyalkanephosphonates, vicinal epoxyalkanephosphonates and omegahaloalkanephosphonates, said vinyl group and said alkane groups being bonded directly to the phosphorus atom.

3. The method of claim 2 wherein said starch and phosphonating agent are reacted at a pH within the range of 9 to 13.

4. The method of claim 3 wherein said phosphonating agent is a chlorohydroxyethanephosphonate.

5. The method of claim 3 wherein said phosphonating agent is selected from the group consisting of 1-chloro-2-hydroxyethanephosphonic acid and 2-chloro-1-hydroxyethanephosphonic acid.

6. The method of claim 3 wherein said phosphonating agent is a chlorohydroxypropanephosphonate.

7. The method of preparing a starch ether phosphonate which comprises reacting starch with a vicinal epoxyalkanephosphonate in the presence of an acid catalyst selected from the group consisting of mineral acids and Lewis acids at a temperature within the range of from 10° C. to 200° C., said alkane group being bonded directly to the phosphorus atom.

References Cited

UNITED STATES PATENTS 3,132,066   5/1964   Kerr et al. _____ 162—175
3,317,514   5/1967   Fox et al. _____ 260—233.5
3,422,088   1/1969   Tuschhoff et al. _____ 260—233.3

HOSEA F. TAYLOR, Primary Examiner

M. I. MARQUIS, Assistant Examiner

U.S. Cl. X.R.

117—139.5, 165; 260—209, 219, 233.3

UNITED STATES PATENT OFFICE
CERTIFICATE OF CORRECTION

Patent No. 3,553,194  Dated January 5, 1971

Inventor(s) Frank Verbanac and Kenneth B. Moser

It is certified that error appears in the above-identified patent and that said Letters Patent are hereby corrected as shown below:

Column 2, line 28, for "sever" read ---severe---. Column 2, line 48, for "0.1" read ---0.01---. Column 4, line 42, for "of portions of" read ---portions of---. Column 5, line 16, for "grnaular" read ---granular---. Column 5, line 69, for "four-tenths of" read ---four-tenths grams of---.

Signed and sealed this 25th day of May 1971.

(SEAL)
Attest:

EDWARD M. FLETCHER, JR.  WILLIAM E. SCHUYLER, JR.
Attesting Officer  Commissioner of Patents